(12) United States Patent
Collins et al.

(10) Patent No.: US 11,354,101 B2
(45) Date of Patent: *Jun. 7, 2022

(54) AUTOMATION AND ORCHESTRATION PLATFORM FOR SOFTWARE DEVELOPMENT AND DEPLOYMENT

(71) Applicant: ARGANTEAL, CORP., Austin, TX (US)

(72) Inventors: Mark Collins, Round Rock, TX (US); Greg Andress, Plano, TX (US); Jason McDaniel, Round Rock, TX (US); Steve Kelley, Austin, TX (US)

(73) Assignee: ARGANTEAL, CORP., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/506,886

(22) Filed: Oct. 21, 2021

(65) Prior Publication Data

US 2022/0091826 A1 Mar. 24, 2022

Related U.S. Application Data

(63) Continuation-in-part of application No. 17/025,927, filed on Sep. 18, 2020.

(51) Int. Cl.
*G06F 8/36* (2018.01)
*G06F 8/51* (2018.01)
(Continued)

(52) U.S. Cl.
CPC ............... *G06F 8/36* (2013.01); *G06F 8/51* (2013.01); *G06F 8/60* (2013.01); *G06F 8/70* (2013.01); *G06F 8/427* (2013.01); *G06F 9/5077* (2013.01)

(58) Field of Classification Search
CPC ..... G06F 8/36; G06F 8/51; G06F 8/60; G06F 8/70; G06F 8/427; G06F 9/5077
See application file for complete search history.

(56) References Cited

U.S. PATENT DOCUMENTS 7,823,164 B2 10/2010 Gibbs et al.
8,478,845 B2 7/2013 Agarwala
(Continued)

OTHER PUBLICATIONS

Anirban Bhattacharjee et al., CloudCAMP: Automating Cloud Services Deployment and Management, arxiv.org, 2019, retrieved online on Jan. 31, 2022, pp. 1-12. Retrieved from the Internet: <URL: https://arxiv.org/pdf/1904.02184.pdf>. (Year: 2019).*

(Continued)

*Primary Examiner* — Hanh Thi-Minh Bui
(74) *Attorney, Agent, or Firm* — Hulsey P.C.

(57) ABSTRACT

A system, method, and platform for automated and orchestrated software development and deployment are described. The platform automatically creates scripts for the target platform and orchestrates its execution. The platform receives source script, separates script commands from variables and values, determines source data and target data in the scripts, and stores them separately. The platform further creates a list of end functions (also referred to as tasks) to be executed on the target machine based on a given workflow and target machine data and provides orchestrated detailed execution scripts for the target machine. As one may appreciate, the platform provides an automated way to use an existing script written for one target machine to generate scripts for another target machine.

20 Claims, 14 Drawing Sheets

(51) Int. Cl.
*G06F 8/70* (2018.01)
*G06F 8/60* (2018.01)
G06F 9/50 (2006.01)
G06F 8/41 (2018.01)

(56) References Cited

U.S. PATENT DOCUMENTS

| | | |
|---|---|---|
| 8,490,117 B1 | 7/2013 | Brichford |
| 2019/0268178 A1 | 8/2019 | Fairweather |
| 2019/0303213 A1* | 10/2019 | Chaganti .................. G06F 8/60 |
| 2019/0334909 A1 | 10/2019 | Schmitt |

OTHER PUBLICATIONS

Neeraj Asthana et al.; A Declarative Approach for Service Enablement on Hybrid Cloud Orchestration Engines, 2018, IEEE, retrieved online on Nov. 22, 2021, pp. 1-7. Retrieved from the Internet; <URL: https://ieeexpore.ieee.org/stamp.stamp.jsp?tp=&arnumber=8406175. (Year:2018).

* cited by examiner

1000

ORIGINAL SCRIPT
1002

VARIABLES/DATA

```

# CREATE AWS VIRTUAL PRIVATE NETWORK

# PREREQUISITES: NONE

Import boto3
Import logging
Logging.info ('initializing session ..')
Session= boto3.session.Session(
Aws_access_key_id='AKIAWGTU2MDH4UJE23HI'
Aws_secret_access_key='josoHTPdXo8QbnJuOQAKe66KN8pzTVi4z5ke7+B'.
Region_name='us-west-1')
Ec2=session.resource('ec2')
Logging.info ('creating vpc..')
# Create the VPC
Vpc=ec2.create_vpc(cidrBlock='10.0.0.0/16')
Vpc.create_tags(Tags=[{"Key":"Name","value":'aws-test-jtm-vpc'}])
Vpc.wait_until_available()
Logging.info('created vpc.')
```

PARSED SCRIPT
1004

VARIABLES/DATA

META DATA

```

# CREATE AWS VIRTUAL PRIVATE NETWORK

# PREREQUISITES: NONE

Import boto3
Import logging
Logging.info ('initializing session ..')
Session= boto3.session.Session(
Aws_access_key_id='^AWS_ACCESS_KEY_ID^',
Aws_secret_access_key='^AWS_SECRET_ACCESS_KEY^',
Region_name='^AWS_REGION^')
Ec2=session.resource('ec2')
Logging.info ('creating vpc..')
# Create the VPC
Vpc=ec2.create_vpc(cidrBlock='10.0.0.0/16')
Vpc.create_tags(Tags=[{"Key":"Name","value":'aws-test-jtm-vpc'}])
Vpc.wait_until_available()
Logging.info('created vpc.')
```

FIG. 10

AUTOMATION AND ORCHESTRATION PLATFORM FOR SOFTWARE DEVELOPMENT AND DEPLOYMENT

CROSS-REFERENCE TO RELATED APPLICATIONS

This application is a continuation-in-part of U.S. application Ser. No. 17/025,927, filed May 4, 2021, titled "AUTOMATION AND ORCHESTRATION PLATFORM FOR SOFTWARE DEVELOPMENT AND DEPLOYMENT," which claims benefit of U.S. Provisional Application No. 63/138,681, filed Jan. 18, 2021; all of which are hereby incorporated by reference in their entirety.

FIELD

Embodiments of the present invention relate to automation and orchestration platform for software development and deployment. In particular, embodiments of the present invention relate to automation and orchestration of software development and deployment across different target devices.

DESCRIPTION OF THE RELATED ART

As the number of devices operating on different platforms and under different network environments is growing, software development and deployment are becoming more challenging. Traditionally, most of the software are developed with an understanding of the target system, environment, platform, and infrastructure. A user (e.g., an engineer) tasked to develop and deploy new software, a patch, or service typically starts with a high-level design specification, identifies vendor-specific requirements and use personal knowledge and experience to determine the necessary equipment, create a low-level design and write software code, which may include commands, variable and values, for the target system. For each system to be deployed, the engineer executes the commands in the implementation instructions for the target system. The user then creates operating instructions for operating the systems and executes those to place the system under operational management. As one may note, for each target system, the user may have to create a new script, test it, and then deploy it.

For any changes in the platform, technology, architecture, network environment, the code (also referred to as script) needs to be revisited for a new deployment. Several layers of implementations are required for designing and deploying scripts for a diverging set of target systems.

Several provisioning tools have been developed in the past to ease the deployment at a large scale. FIG. 1 illustrates the existing approach for creating a custom deployment script. Existing tools, such as source and target script development platform 116 would receive the manual script template 102 and may require a user to make changes to target device identification code 104, source identification code 106, target API code (1) 108, target API code (N) 110, source code 112, and source configuration code 114. The platform helps generate a custom deployment script 118 for target cloud 120. The user would, however, need to manually map the source functions with target functions and would need to know both functions of the source script and the corresponding functions of the target script. This type of development and deployment model fails to scale.

These provisioning tools allow users to code the commands to be executed using the service catalog and provisioning tool. These tools require users to manually map high-level design to the individual commands necessary to implement the high-level design and then manually execute those commands. If the Enterprise decides to move the application from one technology (hypervisor, operating system) to another, someone needs to recreate mapping again. The new mapping may have to be done by a completely different user who may have expertise on the new platform. However, the new user may have to study the high-level design, target system and do the mapping accordingly. Very little of the information gathered and generated for these deployments is retained and usable for subsequent projects.

Many automation and orchestration platforms have been developed in the past that attempt to ease software development and deployment problems. DevOps automation is a process by which a single, repeatable task, such as launching an app or changing a database entry, is made capable of running without human intervention, both on PCs and in the cloud. Automation applies to functions that are common to one area, such as launching a web server, or integrating a web app, or changing a database entry. But when all of these functions must work together, DevOps orchestration is required. Orchestration is the mechanism that organizes components and multiple tasks to run applications seamlessly.

An example prior art document, U.S. Pat. No. 7,823,164 titled "Automated generation of different script versions," discloses methods, systems, and computer program products for automated generation of different script versions. A script preprocessor of the proposed system automatically adds specified functionality (e.g., debugging, testing, tracing, etc., functionality) to an existing script. The preprocessor receives a script, which includes one or more script instructions and comments, and descriptive data from which script instructions for implementing specified further functionality (e.g., debugging, testing, tracing, etc. The preprocessor receives an indication that a version of the script that implements the specified further functionality is to be created. In response to the received indication, the preprocessor parses the comments to access the descriptive data, infers additional script instructions for implementing the further specific functionality based on the accessed descriptive data, and inserts the additional script instructions into appropriate locations within the received script.

Similarly, another U.S. patent application Ser. No. 16/505,267 titled "automatically deployed Information Technology (IT) system and method" describes a controller that automatically manages a physical infrastructure of a computer system based on a plurality of system rules, a system state for the computer system, and a plurality of templates. Techniques for automatically adding resources such as a computer, storage, and/or networking resources to the computer system are described. The application describes techniques for automatically deploying applications and services on such resources. These techniques provide a scalable computer system that can serve as a turnkey, scalable private cloud.

Most of these systems and methods are useful in applications involving producing machine-readable code scripts where the user prepares the script and utilizes different characters and variables or functions to be run into the system in order to produce the automated scripts as the output for a target machine on the target user side. All these existing systems, methods, and tools require user involvement at different states and produce scripts that again need to be tested before deployment as the scripts may have multiple dependencies, include dependencies related to authentication, identification, infrastructure, and target machine-specific dependencies. When the software has to be deployed on a new target machine, the entire process has to be repeated.

Therefore, there is a need for a system that can provide easy, efficient, and effective automation and orchestration for software development and deployment.

SUMMARY

System, method, and platform are described for automated and orchestrated software development and deployment. The platform automatically creates scripts for the target platform and orchestrates its execution. The platform receives source script, separates script commands from variables and values, determines source data and target data in the scripts, and stores structured data and scripts separately. The platform further creates a list of end functions (also referred to as tasks) to be executed on the target machine based on a given workflow and target machine data and provides orchestrated detailed execution scripts for the target machine.

According to an embodiment, the automation and orchestration platform receives source script, parses the script to separate commands and variables, creates code blocks, determines end functions, and stores them in a script catalog repository. The platform parses the script to identify the source and target variables, values, code blocks, end functions, configuration details, identity and access management information, and infrastructure information. The platform may separate source data and target data. The source data includes the IAM template, configuration template, infrastructure template, and the extracted variable associated with the source machine, user, and the environment associated with the source script. The target data includes the IAM template, configuration template, infrastructure template, and the extracted variable associated with the target machine for which the source script was originally written.

The platform processes the parsed file in edit mode to identify and replace values with merger fields, which help separate the organization's proprietary data, which can be stored in a private data catalog repository associated with an organization. The values within the script are replaced with merge fields to be used during the compilation process.

The platform determines template data for merge fields and original script and stores the template data in the data repository and scripts in the script catalog repository. The platform determines the script's end functions and ontological structure associated with them and stores the end functions with the associated ontological structure in the script catalog repository.

The platform further includes a workflow creation module that receives workflow information from a user, combines source and target data with library workflow functions, and generate an appropriate workflow for the target machine. In an embodiment, the workflow creation module determines the required scripts and data template. The workflow creation module provides template workflow and functions along with the ontological structure for the target machine.

The platform further includes a custom compiler that takes the determined workflow data template, workflow functions, and source and target data and creates execution scripts from catalog inventory data and workflow functions. The compiler generates the source and targets specific executable scripts. The compiler generates orchestrated detailed execution scripts for the target machine.

The platform abstracts the problem of script creation and deployment for the new target machine. The proposed platform just requires the user to provide workflow and data required for the target machine. The required data may include identification and authentication data, configuration data, and infrastructure data. In an embodiment, the platform can retrieve part or all the required data from its custom libraries based on the identification of the target machine.

The platform may use custom libraries to store scripts, templates, commands, functions, workflow templates, etc. These custom libraries include a public library, a private library, and classified libraries. The platform may use these with the right privileges and in the right form.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 10 illustrates an example scrip from which script and data are isolated and parsed script is generated in accordance with an embodiment of the present disclosure.

DETAILED DESCRIPTION

Figure 1:
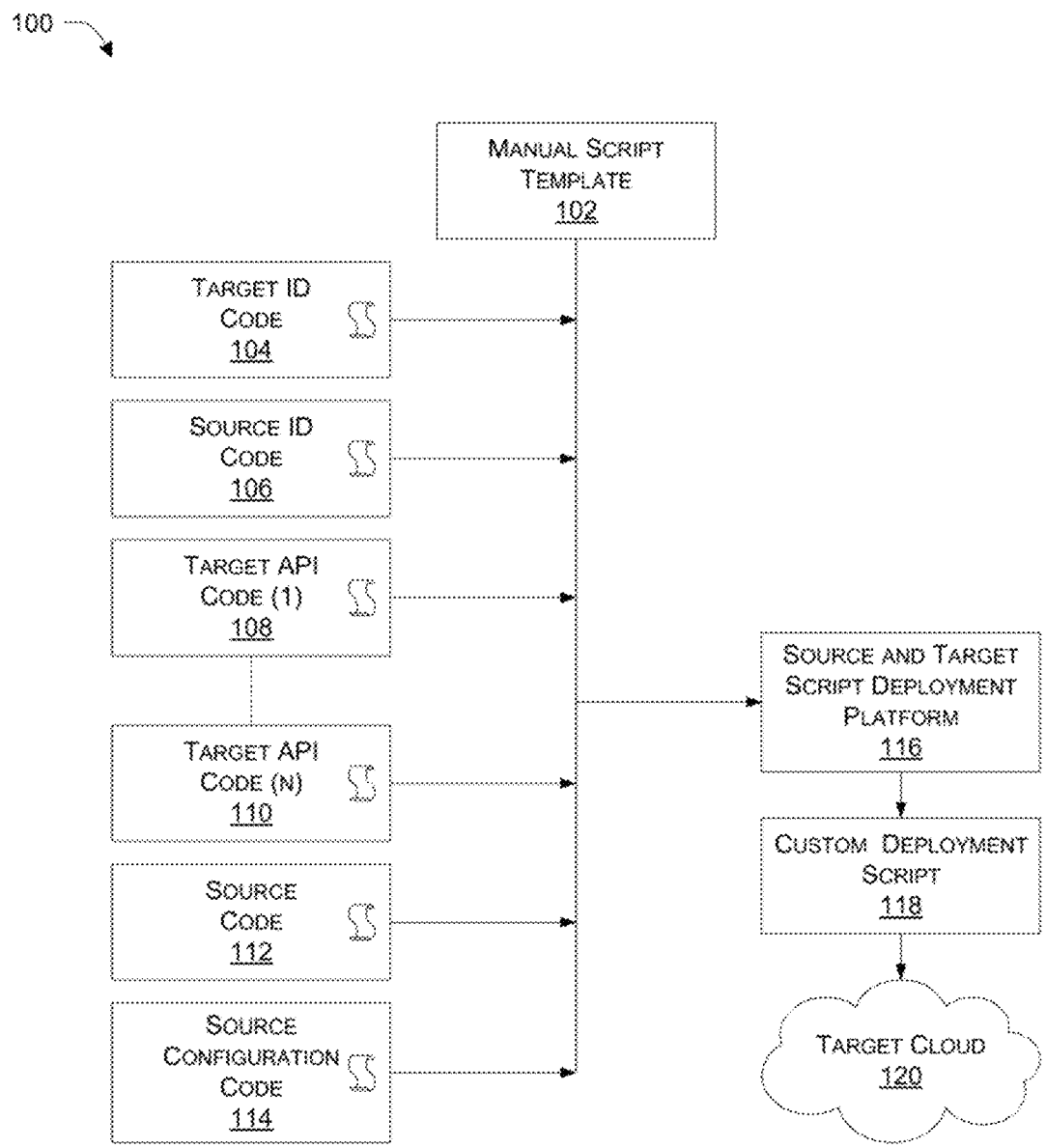
FIG. 1 illustrates a prior art approach for creating a custom deployment script.

The DevOps automation and orchestration platform stores retrieve and rewrites scripts for the target machine as well as automates the orchestration for deployment. Systems and methods are provided for automating script generation for the target machine and for deployment orchestration. According to an embodiment, a system includes a script capturing module for parsing received scripts and storing the commands and variables separately in custom repositories, a workflow creation module to receive workflow input and target machine information from a user, and create a workflow for target machine using knowledge from the custom repositories, and a compiler module to create automated deployment script for the target machine.

The automation and orchestration system can be accessed by any user device once authenticated by any authenticator server. All users having valid credentials can access the automation and orchestration system, and access data may be controlled based on the clearance level of the user. The system can be accessed by a user through a network (e.g., LAN, WAN, or the Internet, etc.). In an embodiment, the system includes various functional modules facilitated to perform different functions. The system includes a script capture module, a workflow creation module, and a compiler module. In an embodiment, the system may further include a script execution module. The script submitted to the system may include commands, variables, data, and metadata, the metadata being the set of data for defining original script information using which user can have access to the original scripts. The script capturing modules parses the script and splits the script into two different components, namely the commands (retaining the actual workflow) and the data component. The parser of the script capturing module identifies all the variables, values, logical code blocks.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form to avoid obscuring the concepts of the presently disclosed method and system.

Embodiments of the present invention include various steps, which will be described below. The steps may be performed by hardware components or may be embodied in machine-executable instructions, which may be used to cause a general-purpose or special-purpose processor programmed with the instructions to perform the steps.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "target output" generally refers to various forms of data, information, services, applications, and/or hardware devices that may be accessed via a network (e.g., the Internet). Non-limiting examples of target output include web applications, cloud-based services, network devices, and/or associated applications (e.g., user interface applications), and network security devices and/or associated applications (e.g., user interface applications). Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Figure 2:
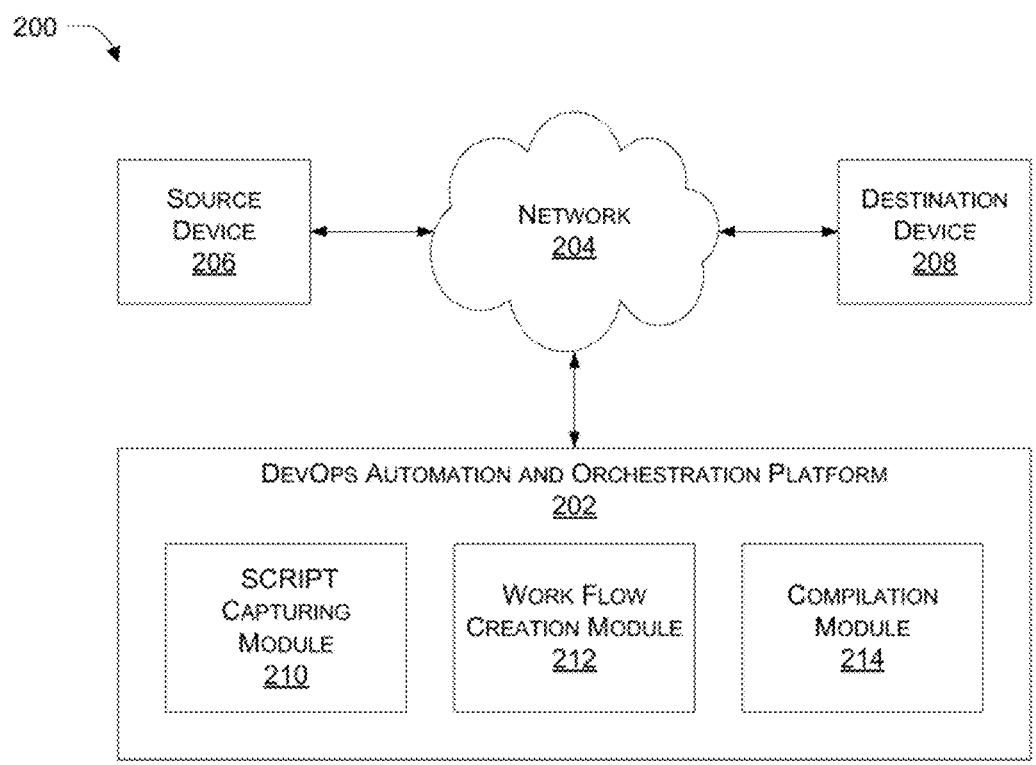
FIG. 2 illustrates the DevOps automation and orchestration platform deployed to receive source script from a source device and create a target script for the target machine in accordance with an embodiment of the present disclosure.

FIG. 2 illustrates the DevOps automation and orchestration platform deployed to receive source script from a source device and create a target script for the target machine in accordance with an embodiment of the present disclosure. The DevOps automation and orchestration platform 202 may receive source script and input about the destination device 208 from the user of a source device 206. The source device and the destination device 208 may be connected through a suitable communication network, for example, network 204. A user can access platform 202 using valid credentials and submit source script using an interactive user interface, which may be a browser-based interface or a local client application interface. The user submits the script for future use or may submit the script for automatically generating orchestrated script for destination device 208, referred interchangeably as target device or target machine throughout this document. The platform 202 may receive the source script written in one language and/or written for one target device and may automatically generate a script for another target. Platform 202 allows to reuse of the existing script and create a target script for target device 208 without much user involvement. The platform 202 may automatically generate a target script and orchestrate its deployment on the target device 208.

In an embodiment, the platform 202 includes a script capturing module 210 that receives the original script, parses commands, variables, and values from the original script, and stores the commands, variables, and values in appropriate repositories. In an embodiment, the script capturing module 210 may store the commands in the global script catalog repository and store the variables and values in a separate data catalog repository, which may hold other proprietary data of an organization. The script capturing module 210 may further split the source data and target data from the script to remove the dependencies. Parser of the script capturing module 210 may separate source data, such as identity and access management data (e.g., user credentials, access rights, etc.), configuration data, infrastructure information, and other variables and values using the identity and access management (IAM) template, configuration template, infrastructure template, syntax information of the variables of the source script. The parser of the script capturing module 210 may similarly separate destination data, such as identity and access management data (e.g., user credentials, access rights, etc.), configuration data, infrastructure information, and other variables and values using the identity and access management (IAM) template, configuration template, infrastructure template, syntax information of the variables of the target script and that of the target machine.

The script capturing module 210 may store the source script in its original form in the script catalog repository. Module 210 parses script to identify source variables, target variables, values, code blocks and functions, configuration information, and infrastructure information using the knowledge syntax and semantics matching. In an embodiment, module 210 may use historically marked templates for isolating required scripts and data. Module 210 may place the parsed file in edit mode to identify and replace values with merge fields. Module 210 may store the original variables and values in the data catalog repository, which may be retrieved at the time of compilation.

The module 210 further creates template scripts from the parsed source script and merge fields and store the template scripts in the script catalog repository. The module 210 further receives catalog information, and define script end functions and store the end functions with the ontological structure in the script catalog repository.

The platform 202 includes a workflow creation module 212 configured to receive workflow information and target machine information from a user, select matching workflow specific templates and functions from the library, and combine source and target data with identified workflow functions and pass the workflow functions to the compiler module 214. The compiler module 214 of the platform 202 creates an executable script using workflow functions received from module 212 and target data received from the data catalog repository. The executable script can be stored in the script catalog repository for deployment and future reuse.

The workflow creation module 212 receives workflow information from a user, combines source and target data with workflow functions, and generate an appropriate workflow for the target machine. In an embodiment, the workflow creation module determines matching workflow specific data templates from available workflow data templates based on the flow-flow input received from a user and the original script. The data templates include variables, values, and metadata. The workflow creation module 212 provides template workflow and functions along with the ontological structure for the target machine.

The compiler module 214 receives the determined workflow data template, workflow functions and creates execution scripts from catalog inventory data and workflow functions. The compiler module 214 generates the source and target specific executable script. The compiler may generate orchestrated detailed execution scripts for the target machine.

In the embodiment, platform 202 further provides orchestrated deployment of the script on the target machine. As one may appreciate, the script generated would be efficient in its execution as all the dependencies are already removed. When the script is run at the target machine, its execution would be faster as the target machine will not have to make any decisions.

Platform 202 abstracts the problem of script creation and deployment for a new target machine. The proposed platform 202 just requires the user to provide workflow and data required for the target machine. The platform 202 may use earlier submitted matching scripts stored in the script catalog repository to generate target scripts. The platform 202 may use custom libraries to store scripts, templates, commands, functions, workflow templates, etc. These custom libraries include a public library, a private library, and classified libraries. The platform 202 may use these libraries with the right privileges and in the right form.

Figure 3:
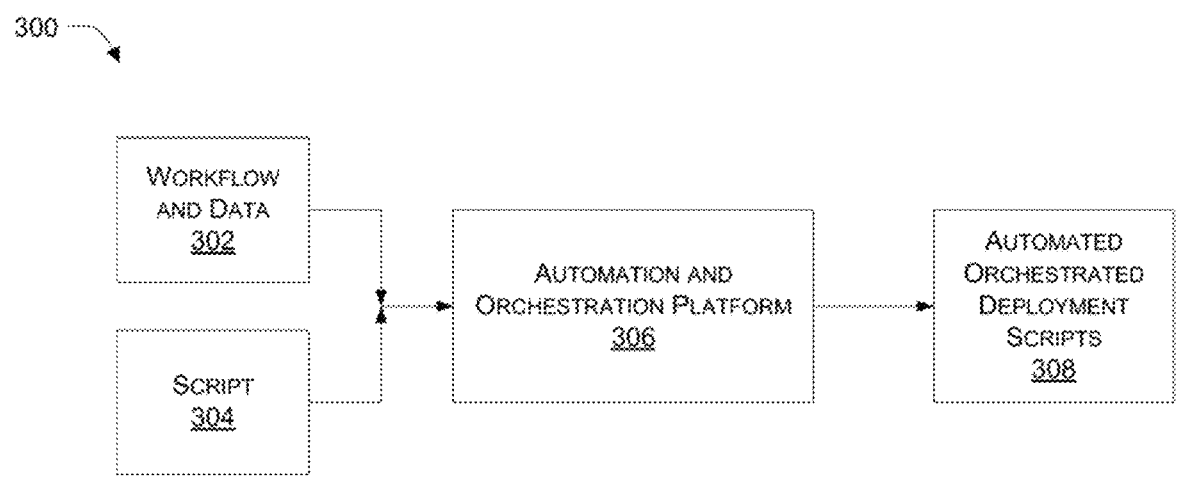
FIG. 3 is a block diagram illustrating an abstracted view of input and output of the automation and orchestration system designed in accordance with an embodiment of the present disclosure.

FIG. 3 is a block diagram illustrating an abstracted view of input and output of the automation and orchestration platform designed in accordance with an embodiment of the present disclosure. An automation and orchestration platform 306 (performing functions similar to the platform 202) may receive scripts 304, parse the script 304 to isolate the commands, variables, and values, and store them in generalized form, removing proprietary details. The platform 306 may maintain the script repository developed over a period of time and facilitate auto mapping of scripts, using end functions, for generating scripts of one language into scripts in a second language. The platform 306 may allow the user to submit workflow and target machine data 302 and determine suitable workflow data templates and associated end functions to be used for the target machine and generate automated orchestrated deployment script 308.

Figure 4:
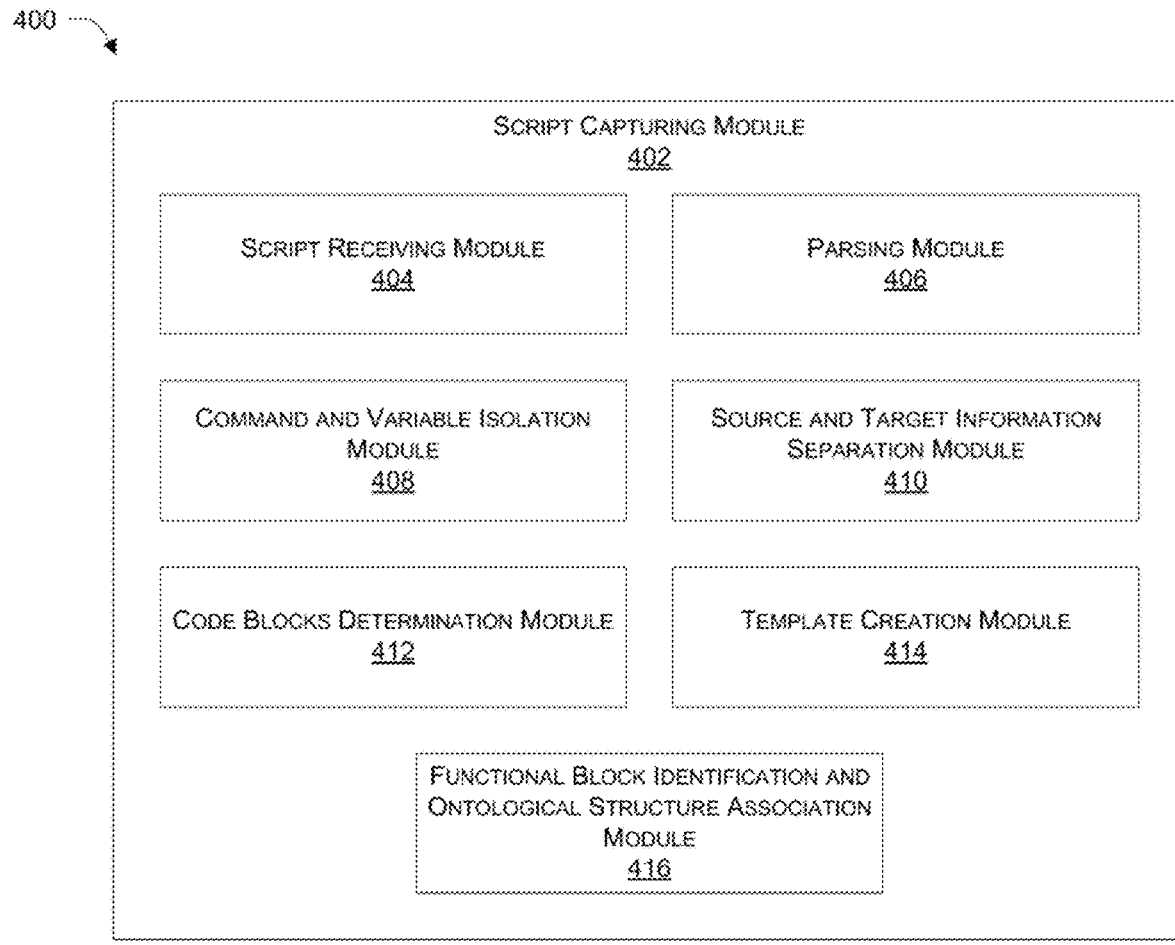
FIG. 4 illustrates functional sub-modules of script capturing module created in accordance with an embodiment of the present disclosure.

FIG. 4 illustrates functional sub-modules of script capturing module created in accordance with an embodiment of the present disclosure. Script capturing module 402 (same as module 210) may include functional sub-modules, such as script receiving module 404, parsing module 406, command and variable isolation module 408, source and target information separation module 410, code block creation module 412, template creation module 414, and functional block identification and oncological structure association module 416. The script receiving module 404 may allow the user to submit the script using a browser-based or application-based user interface. The user interface may allow the users to drag and drop scripts or upload the scripts in a suitable file format. On receiving the scripts, the parsing module 406 may use different pre-trained templates to parse the submitted script. The parsing module 406 may help command and variable isolation module 408 isolate commands, variables, and values from the submitted script. The source and target information separation module 410 further separates the source data and target data to remove dependencies and generalize the script and stores the generalized script in the script repository. The script capturing module 402 stores the parsed script in edit mode that which is further used by the code block determination module 412. Code block determination module 412 replaces values of variables with merged fields and classifies the parsed script to generate logical (useful) code blocks. In an embodiment, the template creation module 414 generates data templates from the submitted script and classified code block with merged fields. Module 414 stores the data template in the data catalog repository. The script capturing module 402 further includes a functional block identification and oncological structure association module 416 configured to identify end functions that these code blocks are supposed to perform and its ontological structure and stores the end functions and their oncological structure along with it. The scripts, templates, end functions stores in the script catalog repository are used to create scripts for the target device.

Figure 5:
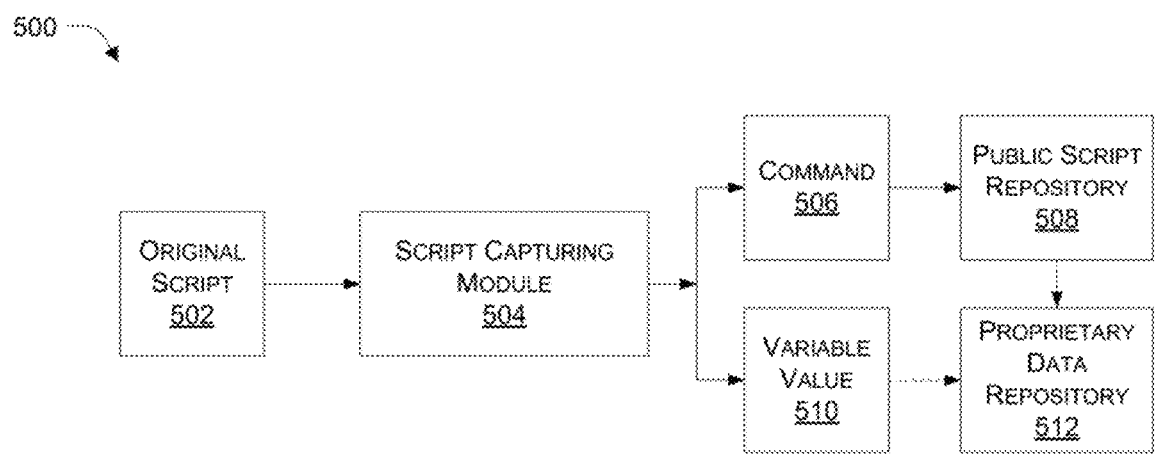
FIG. 5 is a block diagram illustrating the input and output of the script capturing module in accordance with an embodiment of the present disclosure.

FIG. 5 is a block diagram illustrating the input and output of the script capturing module in accordance with an embodiment of the present disclosure. As shown in FIG. 5, the script capturing module 504 (same as script capturing module 402) receives original script 502 and parse the script to isolate commands 506 and variables/values 510. The commands after removing the variable and value may not have any proprietary information and are thus stored in a public script repository 508 (also referred interchangeably as script catalog repository. The variables and values 510 may contain proprietary information of the organization and are thus stored in a proprietary data repository 512 (also referred to as data catalog repository).

Figure 6:
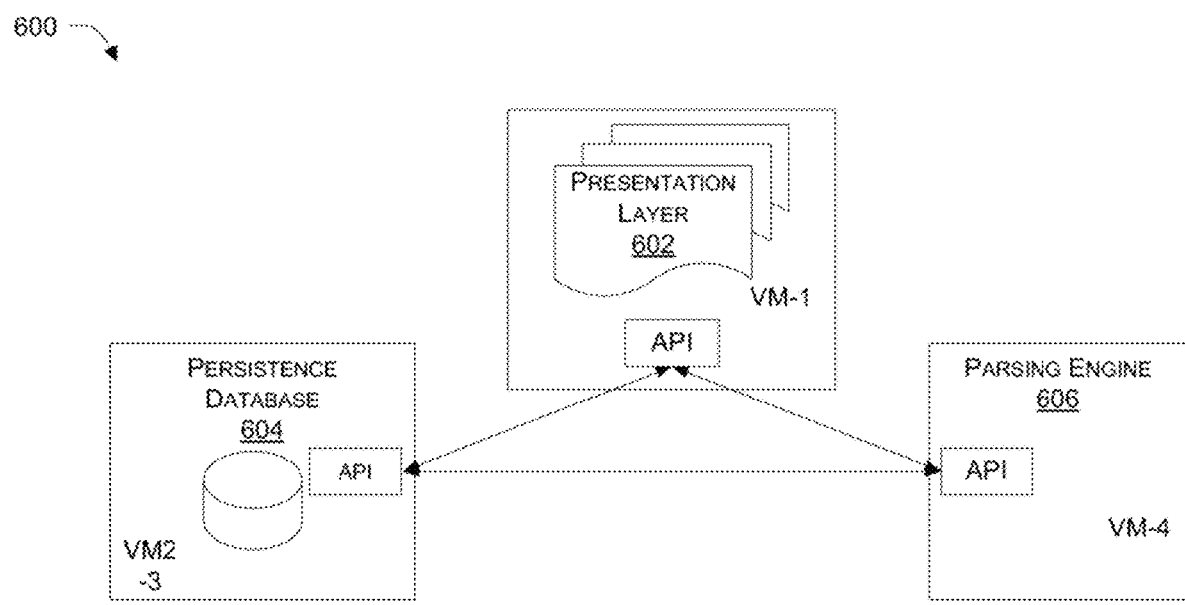
FIG. 6 illustrates interactions between different components of the automation and orchestration system designed in accordance with an embodiment of the present disclosure.

FIG. 6 illustrates interactions between different components of the automation and orchestration system designed in accordance with an embodiment of the present disclosure. As shown in FIG. 6, different subsystems and components at different layers of automation and orchestration system may interact with each other using a suitable application program programming interface (API). The presentation layer of the system allows a user to submit script and/or submit workflow information along with target machine information through the presentation layer 602. The presentation layer 602 presents a user interface through which the user can authenticate himself for either submitting the script or requesting the creation of a script for a target machine or both. When the user needs to create a script for the target machine, the user may be required to submit flow-flow using end functions that need to be performed on the target machine. The system may also collect information related to the target machine from the user to pull the target machine-related information from the data catalog repository. In an embodiment, the system may identify the matching, data template and the right sequence of end function execution, pull the appropriate data templates (variables, values, and metadata), and combine those at the time of compilation to create the automated orchestrated target script to deployed on a target machine. The parsing engine 606, which is a specific implementation of the parsing engine, may receive the submitted script using the first API from the presentation layer and may submit the parsed script into persistence database 604 through another API.

Figure 7:
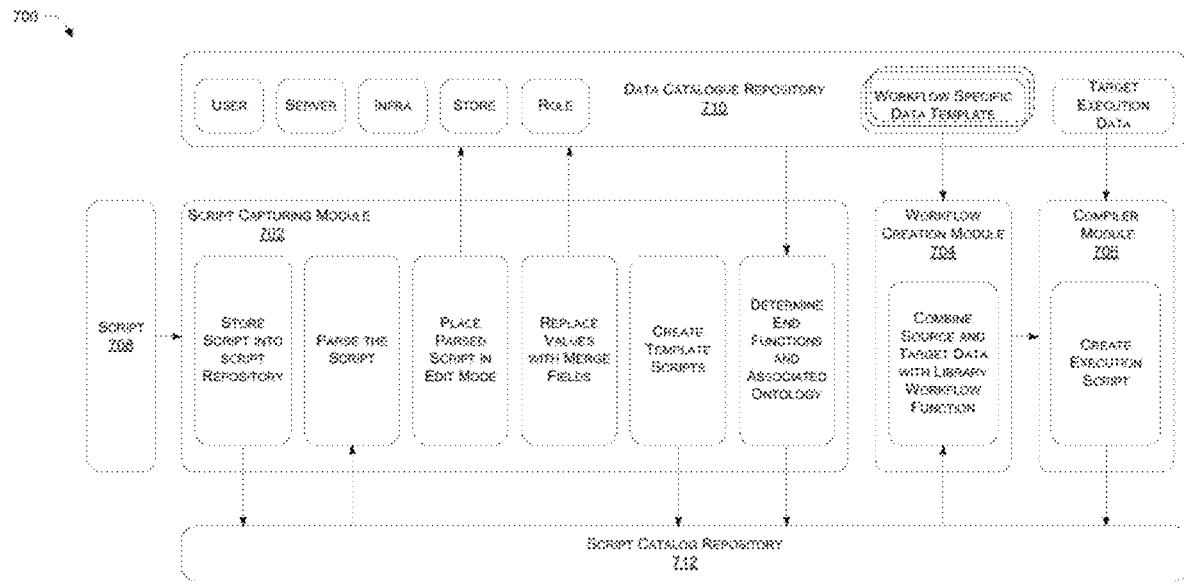
FIG. 7 is an example architecture of the DevOps automation and orchestration system created in accordance with an embodiment of the present disclosure.

FIG. 7 is an example architecture of the DevOps automation and orchestration system created in accordance with an embodiment of the present disclosure. The DevOps automation and orchestration system 700 includes script capturing module 702, workflow creation module 704, compiler module 706, script catalog repository 712, and data catalog repository 710. The script capturing module receives a local script (also referred to as source script). The script capturing module 702 may store the source script into script catalog repository 712 and parse the source script to identify source data and target data. The parser may isolate the commands, variables, and values referred to collectively as data templates. The script capturing module 702 may extract proprietary data such as user identification and authentication data, server details, infrastructure details, storage information, and enterprise rules from the submitted script and store these proprietary data into the data catalog repository 710 separate from the script catalog repository 712. The parser identifies logical code blocks in the source script and further determines the matching data template. Script capturing module 702 further places parsed filed into edit mode to identify and replace values with merge fields. The values within the script are replaced with merge fields and can be retrieved and used in the compilation process. The system 700 further includes a workflow creation module 704 configured to create the workflow and combine proprietary information required during the compilation process and allows the compiler module 706 to generate an automated orchestrated target script. On receiving a new workflow that needs to be deployed in the target machine(s), the platform may select parsed scripts from script repository 712 and pull the required data template from the data catalogue repository 710. The parsed scripts and data templates are supplied to the compiler, which generates an execution script for the target machine.

Figure 8:
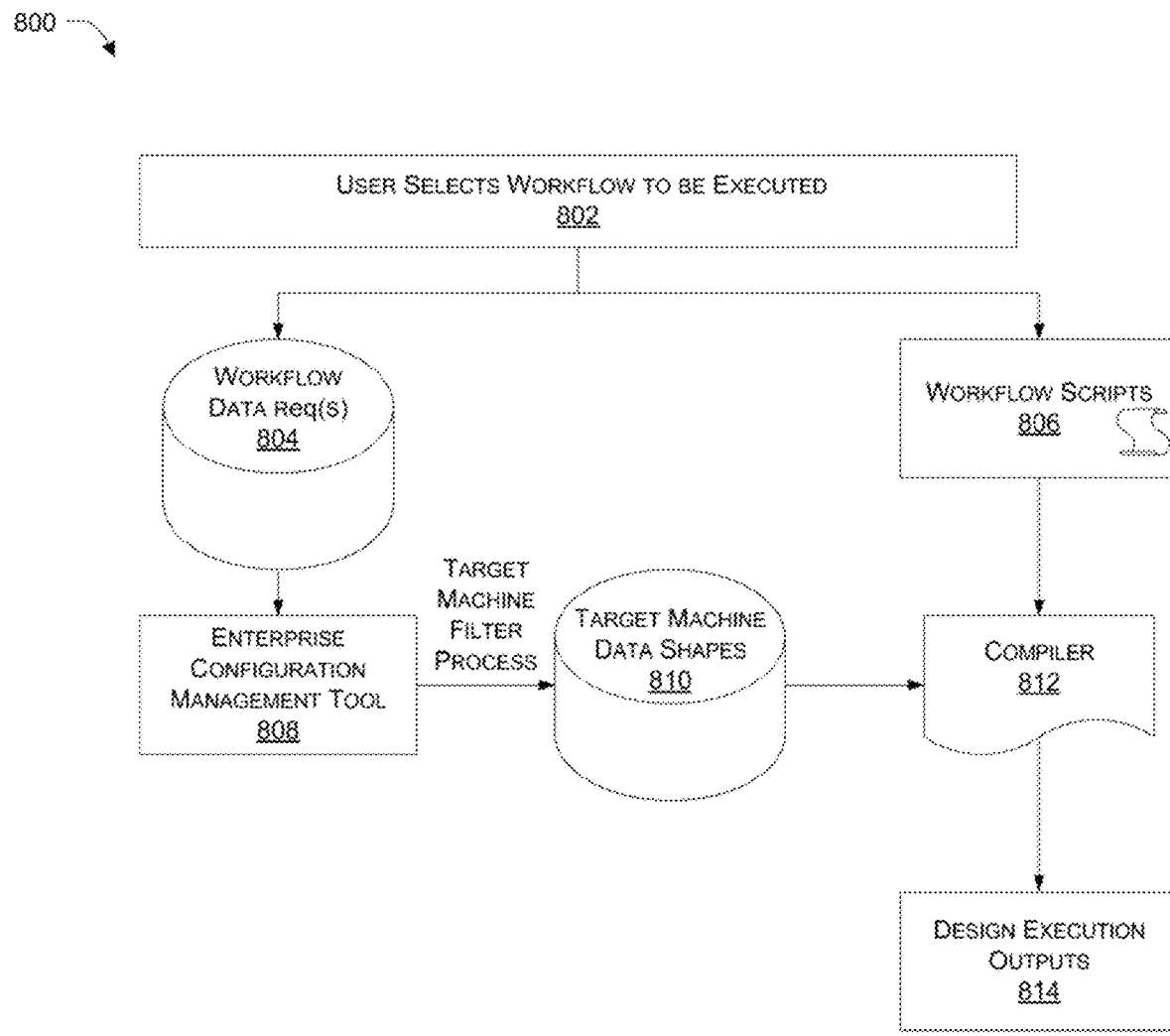
FIG. 8 is an example of design execution output being created for a given workflow in accordance with an embodiment of the present disclosure.

FIG. 8 is an example of design execution output being created for a given workflow in accordance with an embodiment of the present disclosure. The automation and orchestration platform allows a user to select workflows 802 to be executed on a target machine. The platform determines workflow data requirements 804 and one or more workflow scripts 806. The workflow data requirement 804 can be retrieved through an enterprise configuration tool management tool 808. The platform may apply a target machine filter to retrieve the target machine(s) specific data shapes from data repository 810 containing target machine data shapes. A compiler 812 may receive one or more scripts required for executing the given workflow and the target machine-specific data and compile those to create design execution output script 814. As one will appreciate, the platform does not require users to write any code. Users can just submit the intended workflow, and the script for the target machine is generated.

Figure 9:
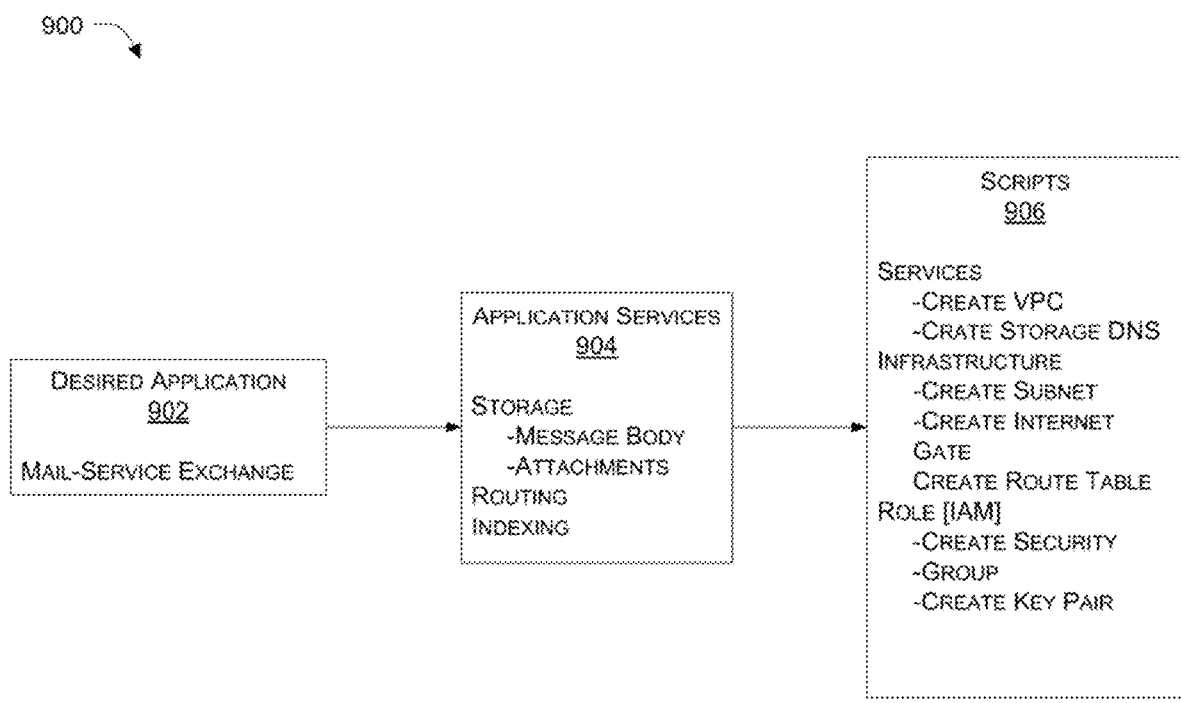
FIG. 9 is an example workflow that can be used by a compiler to create execution output in accordance with an embodiment of the present disclosure.

FIG. 9 is an example workflow that can be used by a compiler to create execution output in accordance with an embodiment of the present disclosure. As shown in FIG. 9, for deploying the desired application 902 a mail service-exchange, the platform may suggest required application services 904, such as storage, routing, indexing, etc., that needs to be configured for deploying mail service-exchange. Specific data required for configuration can be requested from the user when a platform is not able to pull the required from the data repository. Scripts 906, such as service configuration scripts, infrastructure configuration scripts, and role relates scripts, can be determined for a specific deployment. The platform may retrieve data required by these service configuration, infrastructure configuration, and role configuration from the data repository or may request the user to provide such data.

FIG. 10 illustrates an example scrip from which script and data are isolated and parsed script is generated in accordance with an embodiment of the present disclosure. A show in FIG. 10, when original script 1002 is submitted, the platform isolates data from the script and store them separately. The platform may store the parsed script 1004 in the script repository and structured data (variable and values) and associated metadata in the data repository. At the time of compilation, the parsed script is retrieved from the script repository, and the structured data is retrieved from the data repository and compiled to create the target script.

Figure 11:
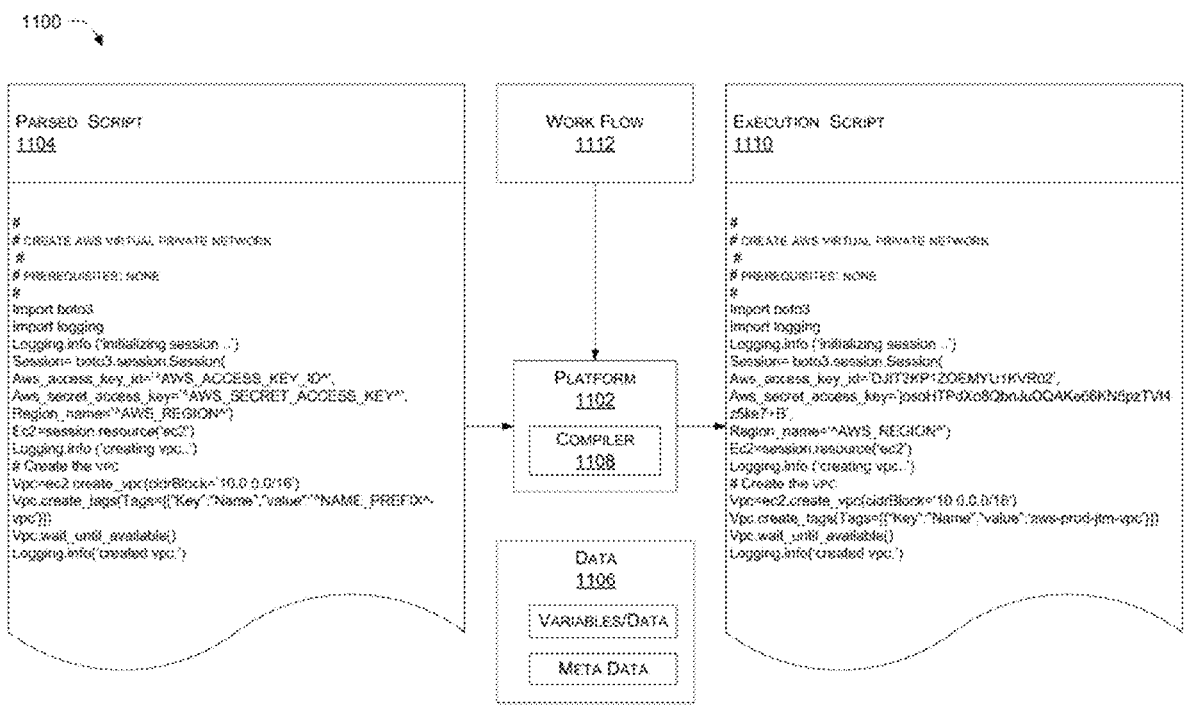
FIG. 11 illustrates an example of a compiler generating target specific execution code from parses script and data for a given workflow in accordance with an embodiment of the present disclosure.

FIG. 11 illustrates an example of a compiler generating target specific execution code from parses script and data for a given workflow in accordance with an embodiment of the present disclosure. As shown in FIG. 11, a platform 1102 may receive workflow 112, pull the pre-stored parsed script 1104 from script repository and required data 1106 from structured data and metadata from the data repository. A compiler 1108 associated with the platform 1102 receives the parsed script, updates the variable and values in the script, and creates the target execution script 1110.

Figure 12:
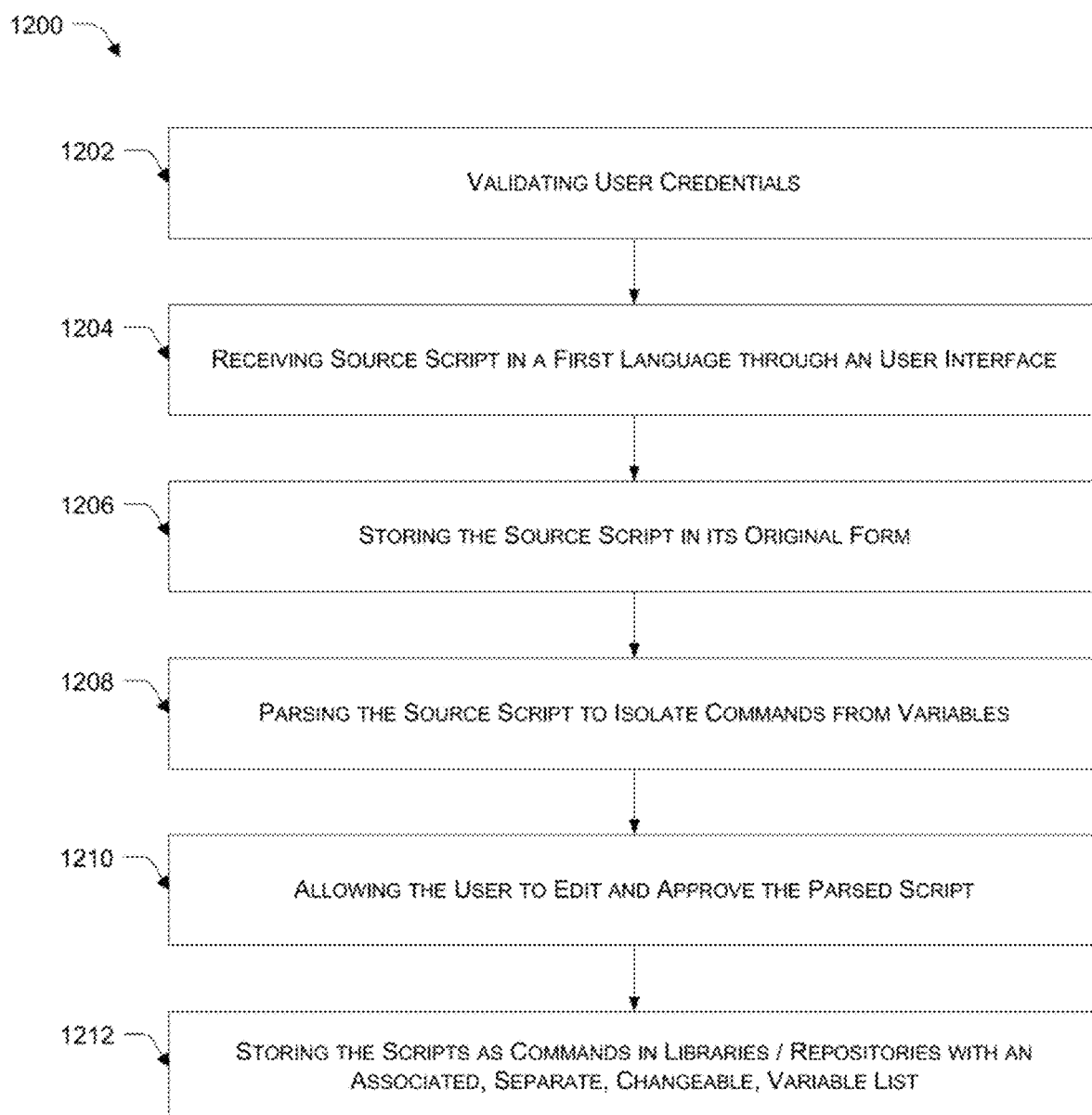
FIG. 12 is a flow diagram illustrating the process of script capturing in accordance with an embodiment of the present disclosure.

FIG. 12 is a flow diagram illustrating the process of script capturing in accordance with an embodiment of the present disclosure. As shown in FIG. 12, an example method for script capturing includes steps of Validating user credential, as shown in block 1202, receiving source script in a first language through a user interface as shown in block 1204, storing the source script in its original form as shown at block 1206, parsing the source script to isolate commands from variables as shown at block 1208, allowing the user to edit and approve the parsed script as shown at block 1210 and storing the script as commands in libraries/repositories with an associated separate, changeable, variable list and as shown at block 1212.

Figure 13:
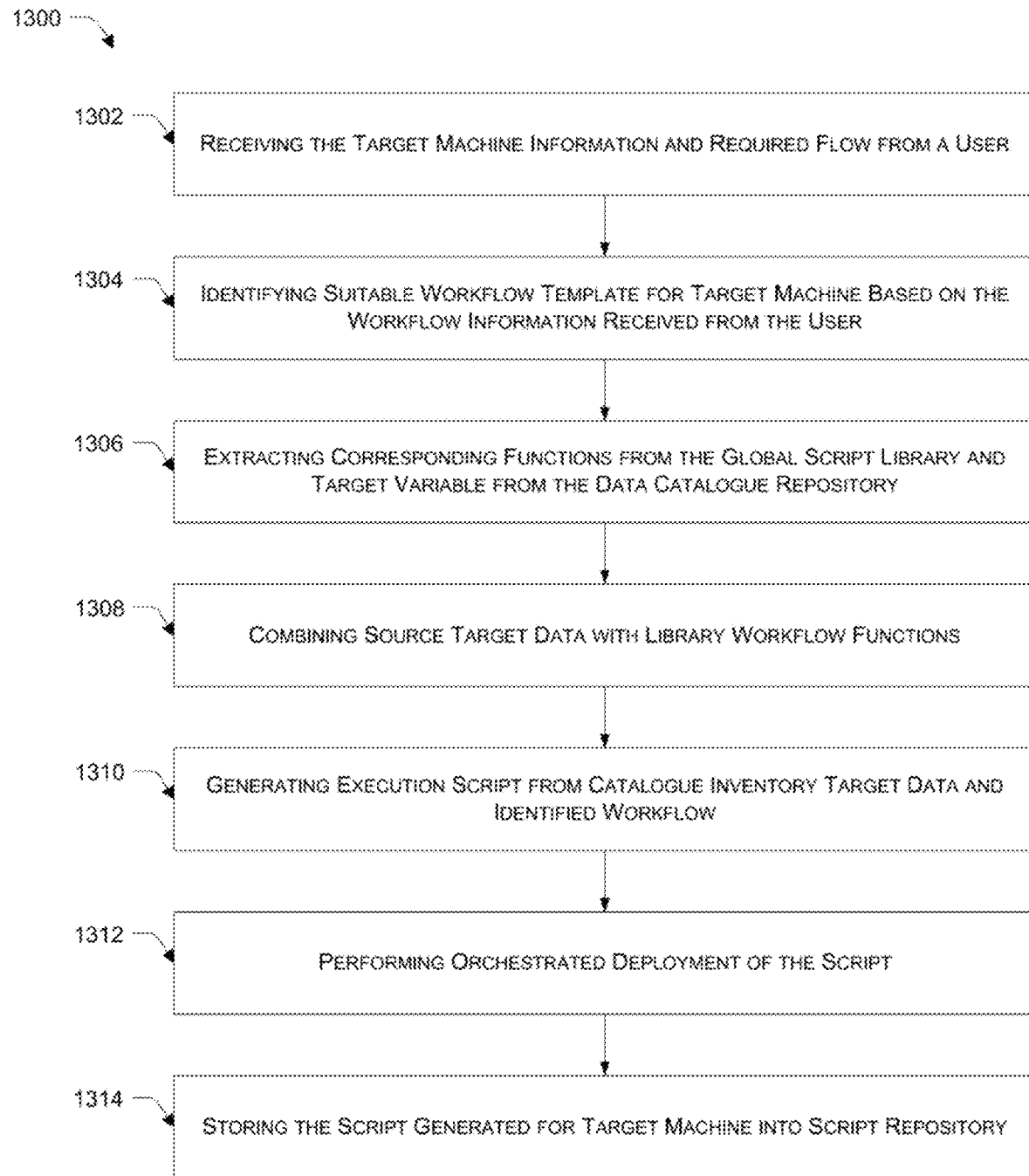
FIG. 13 is a flow diagram illustrating DevOps automation and orchestration in accordance with an embodiment of the present disclosure.

FIG. 13 is a flow diagram illustrating the DevOps automation and orchestration method in accordance with an embodiment of the present disclosure. The method includes steps of receiving the target machine information and required flow from a user, as shown in block 1302, identifying suitable workflow template for target machine based on the workflow information received from the user, as shown in block 1304, extracting corresponding functions from the global script library and target variables from the data catalog repository as shown at block 1306, combining source and target data with library workflow functions, as shown at block 1308 and generating execution script from catalog inventory target data and identified workflow as shown at block 1310. Method 1300 further includes steps of performing orchestrated deployment of the script on the target machine, as shown in block 1312, and storing the script generated for the target machine into script repository as shown in block 1314.

As one will appreciate, the proposed platform, system, and method usages target-specific template identified from the pull of stored templates for the given workflow information and uses the target-specific template to define the output. The proposed system requires an explicit and concrete definition of the target machine/target environment that includes ID & authentication credentials, configuration information, and infrastructure information. The platform logically separates source and target script and associated commands and variables, which makes the recompilation for different targets easy.

The proposed platform, system, and method help reduce software development and deployment time significantly and also improves the efficiency of scripts that are executed on the target machine as dependencies are removes and condition checks are not required during run time.

In an embodiment, the system may receive the script in the first language and generate a script for a second target language. The system allows a user to generate an automated script for the target device by just defining the target function and the function workflow. The system automatically determines a suitable template from the repository, extracts relevant data or values required for the selected function, and generates the script for the target device. As more and more scripts are added to the repository, the system becomes more efficient and may automatically map code blocks with end functions and templates. Appropriate workflow can be identified easily as the system learns every time when the new script is generated.

Figure 14:
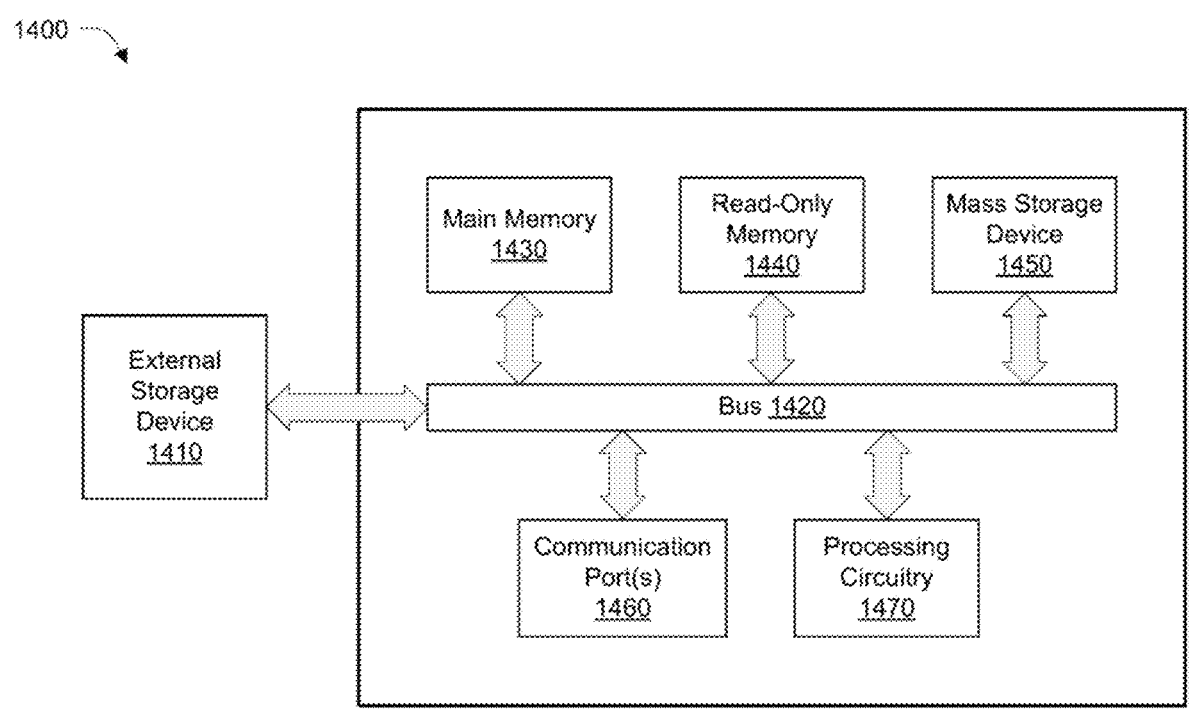
FIG. 14 illustrates an exemplary computer system in which or with which embodiments of the present disclosure may be utilized.

FIG. 14 illustrates an exemplary computer system in which or with which embodiments of the present disclosure may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. As shown in FIG. 8, the computer system includes an external storage device 1410, a bus 1420, a main memory 1430, a read-only memory 1440, a mass storage device 1450, a communication port 1460, and a processing circuitry 1470.

Those skilled in the art will appreciate that computer system 1400 may include more than one processing circuitry 1470 and communication ports 1460. The processing circuitry 1470 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, Hexa-core, or any suitable number of cores) or supercomputer. In some embodiments, processing circuitry 1470 is distributed across multiple separate processors or processing units, for example, multiple of the same type of processing units (e.g., two Intel Core i7 processors) or multiple different processors (e.g., an Intel Core i5 processor and an Intel Core i7 processor). Examples of processing circuitry 1470 include, but are not limited to, an Intel® Itanium® or Itanium 2 processor(s), or AMD® Opteron® or Athlon MP® processor(s), Motorola® lines of processors, System on Chip (SoC) processors, or other future processors. Processing circuitry 1470 may include various modules associated with embodiments of the present invention.

Communication port 1460 may include a cable modem, Integrated Services Digital Network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 1460 can be any of an RS-232 port for use with a modem-based dialup connection, a 10/100 Ethernet port, a Gigabit or 10 Gigabit port using copper or fiber, a serial port, a parallel port, or other existing or future ports. Communication port 1460 may be chosen depending on a network, such as a Local Area Network (LAN), Wide Area Network (WAN), or any network to which the computer system connects.

Memory 1430 may include Random Access Memory (RAM) or any other dynamic storage device commonly known in the art. Read-only memory 1440 can be any static storage device(s), e.g., but not limited to, a Programmable Read-Only Memory (PROM) chips for storing static information, e.g., start-up or BIOS instructions for processing circuitry 1470.

Mass storage 1450 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) 10 recorders, BLU-RAY 3D disc recorders, digital video recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement storage memory in 1430. Memory 1450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Desk star 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 1420 communicatively connects processor(s) 1470 with the other memory, storage, and communication blocks. Bus 1420 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 1470 to a software system.

Optionally, operator and administrative interfaces, e.g., a display, keyboard, and a cursor control device, may also be coupled to bus 1420 to support direct operator interaction with the computer system. Other operator and administrative interfaces can be provided through network connections connected through communication port 1460. An external storage device 1410 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 1400 may be accessed through a user interface. The user interface application may be implemented using any suitable architecture. For example, it may be a stand-alone application wholly implemented on the computer system 1400. The user interfaces application and/or any instructions for performing any of the embodiments discussed herein may be encoded on computer-readable media. Computer-readable media includes any media capable of storing data. In some embodiments, the user interface application is a client server-based application. Data for use by a thick or thin client implemented on an electronic device computer system 1400 is retrieved on-demand by issuing requests to a server remote to the computer system 1400. For example, computing device 1400 may receive inputs from the user via an input interface and transmit those inputs to the remote server for processing and generating the corresponding outputs. The generated output is then transmitted to the computer device 1400 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter outlined in the claims is not intended to be limited to the embodiments shown herein but is to be accorded to the widest scope consistent with the principles and novel features disclosed herein. It is contemplated that additional embodiments are within the spirit and true scope of the disclosed subject matter.

We claim:

1. A method for automated and orchestrated software development and deployment, the method comprising receiving, by a computing device comprising of a non-transitory storage unit and one or more processing units, from a user, a target machine information, a required workflow, and target machine specific data;

identifying, by the computing device, a set of functions and a corresponding workflow template from a repository based on the target machine information, the target machine specific data and the required workflow received from the user;

extracting, by the computing device, generalized scripts for each function of the set of functions from a global script library, and target variables and corresponding values from a data catalog repository based on the target machine information, wherein the generalized scripts are created by a parser from a set of source scripts that isolates commands from variables and values of the set of source scripts and are stored in the global script library in generalized form removing proprietary details from the set of source scripts;

creating design execution output for the required workflow comprising:

determining workflow data requirement and one or more workflow scripts;

retrieving target machine specific data shapes from data repository; and compiling the one or more workflow scripts and target machine-specific data;

creating, by the computing device, execution scripts using a compiler that combines the generalized scripts, the target variables, the corresponding values, and the target machine-specific data; and orchestrating, by the computing device, deployment of the execution scripts on the target machine.

2. The method of claim 1, wherein the target machine-specific data comprises identification data, authentication data, configuration data, and infrastructure data.

3. The method of claim 1, wherein the global script library develops and maintains a mapping of scripts of a first language to corresponding scripts of a second language.

4. The method of claim 1, wherein the generalized scripts are created by the parser from the plurality of source scripts that isolates commands from variables and values of the source scripts and are stored in the global script library in generalized form removing proprietary details from the plurality of source scripts and stores the proprietary details in a data catalog repository.

5. The method of claim 4, wherein the source scripts are parsed by the parser to isolate source data and target data, separate commands and variables identify logical code blocks, determine workflow, determine end functions.

6. The method of claim 4, wherein the generalized scripts are created by further replacing the values of the variables of the source scripts with merge fields to abstract the source scripts.

7. The method of claim 5, wherein the isolated source data, the target data, the variables, and the value are stored in the data catalog repository.

8. The method of claim 5, wherein the source data comprises an Identity Access Management (IAM) template, configuration template, infrastructure template, and the extracted variables associated with a source machine, user, and environment associated with the source scripts.

9. The method of claim 5, wherein the target data comprises an IAM template, configuration template, infrastructure template, and the extracted variables associated with a target machine for which the source scripts were originally written.

10. The method of claim 1, wherein the orchestrating deployment of the execution scripts on the target machine comprises defining a sequence of execution of end functions of the execution scripts of the target machine.

11. A computer implemented system, comprising:
a memory unit comprising stored instructions; and
a processor configured to execute the stored instructions to cause the system to perform at least:
receive, from a user, a target machine information, a required workflow, and target machine specific data;
identify a set of functions and a corresponding workflow template from a repository based on the target machine information, the target machine specific data and the required workflow received from the user;
extract generalized scripts for each function of the set of functions from a global script library, and target variables and corresponding values from a data catalog repository based on the target machine information, wherein the generalized scripts are created by a parser from a set of source scripts that isolates commands from variables and values of the set of source scripts and are stored in the global script library in generalized form removing proprietary details from the set of source scripts;
create design execution output for the required workflow comprising:
determine workflow data requirement and one or more workflow scripts;
retrieve target machine specific data shapes from data repository; and
compile the one or more workflow scripts and target machine-specific data;
create execution scripts using a custom compiler that combines the generalized scripts, the target variables, the corresponding values, and the target machine-specific data; and
orchestrate deployment of the execution scripts on the target machine.

12. The computer implemented system of claim 11, wherein the target machine-specific data comprises identification data, authentication data, configuration data, and infrastructure data.

13. The computer implemented system of claim 11, wherein the global script library develops and maintains a mapping of scripts of a first language to corresponding scripts of a second language.

14. The computer implemented system of claim 11, wherein the generalized scripts are created by the parser from the plurality of source scripts that isolates commands from variables and values of the source scripts and are stored in the global script library in generalized form removing proprietary details from the plurality of source scripts and stores the proprietary details in a data catalog repository.

15. The computer implemented system of claim 14, wherein the source scripts are parsed by the parser to isolate source data, and target data, separate commands, and variables, identify logical code blocks, determine workflow, determine end functions.

16. The computer implemented system of claim 14, wherein the generalized scripts are created by further replacing the values of the variables of the source scripts with merge fields to abstract the source scripts.

17. The computer implemented system of claim 15, wherein the isolated source data, the target data, the variables, and the value are stored in the data catalog repository.

18. The computer implemented system of claim 15, wherein the source data comprises an Identity Access Management (IAM) template, configuration template, infrastructure template, and the extracted variables associated with a source machine, user, and environment associated with the source scripts.

19. The computer implemented system of claim 15, wherein the target data comprises an IAM template, configuration template, infrastructure template, and the extracted variables associated with a target machine for which the source scripts were originally written.

20. The computer implemented system of claim 11, wherein the orchestrated deployment of the execution scripts on the target machine comprises defining a sequence of execution of end functions of the execution scripts of the target machine.

* * * * *